United States Patent
Venkataramani et al.

(10) Patent No.: US 11,651,584 B2
(45) Date of Patent: May 16, 2023

(54) SYSTEM AND METHOD FOR MEMORY AUGMENTED DOMAIN ADAPTATION

(71) Applicant: General Electric Company, Schenectady, NY (US)

(72) Inventors: Rahul Venkataramani, Bangalore (IN); Rakesh Mullick, Bangalore (IN); Sandeep Kaushik, Bangalore (IN); Hariharan Ravishankar, Bangalore (IN); Sai Hareesh Anamandra, Bangalore (IN)

(73) Assignee: General Electric Company, Schenectady, NY (US)

( * ) Notice: Subject to any disclaimer, the term of this patent is extended or adjusted under 35 U.S.C. 154(b) by 1112 days.

(21) Appl. No.: 16/161,061

(22) Filed: Oct. 16, 2018

(65) Prior Publication Data

US 2020/0118043 A1  Apr. 16, 2020

(51) Int. Cl.
*G06V 10/764* (2022.01)
*G06N 20/00* (2019.01)
*G06F 16/583* (2019.01)
*G06F 16/51* (2019.01)
*G06V 10/776* (2022.01)
(Continued)

(52) U.S. Cl.
CPC ........... *G06V 10/764* (2022.01); *G06F 16/51* (2019.01); *G06F 16/5838* (2019.01); *G06N 20/00* (2019.01); *G06V 10/776* (2022.01); *G06V 10/82* (2022.01); *G06V 10/94* (2022.01)

(58) Field of Classification Search
CPC ..... G06N 20/00; G06F 16/5838; G06F 16/51; G06V 10/764; G06V 10/82; G06V 10/94; G06V 10/776
See application file for complete search history.

(56) References Cited

U.S. PATENT DOCUMENTS 6,430,430 B1   8/2002  Gosche
8,891,858 B1 * 11/2014  Preetham ............. G06K 9/6256
                                                    382/209

(Continued)

OTHER PUBLICATIONS

Ronneberger, "U-Net Convolutional Networks for Biomedical Image Segmentation", International Conference on Medical image computing and computer-assisted intervention, pp. 234-241, May 18, 2015.

(Continued)

*Primary Examiner* — Beau D Spratt (57) ABSTRACT

A system is presented. The system includes an acquisition subsystem configured to obtain images corresponding to a target domain. Moreover, the system includes a processing subsystem in operative association with the acquisition subsystem and including a memory augmented domain adaptation platform configured to compute one or more features of an input image corresponding to a target domain, identify a set of support images based on the features of the input image, where the set of support images corresponds to the target domain, augment an input to a machine-learnt model with a set of features, a set of masks, or both corresponding to the set of support images to adapt the machine-learnt model to the target domain, and generate an output based at least on the set of features, the set of masks, or both. Additionally, the system includes an interface unit configured to present the output for analysis.

22 Claims, 4 Drawing Sheets

(51) Int. Cl.
    *G06V 10/82*     (2022.01)
    *G06V 10/94*     (2022.01)

(56) References Cited

U.S. PATENT DOCUMENTS

| | | | |
|---|---|---|---|
| 8,992,405 | B2 | 3/2015 | Chebrolu et al. |
| 9,633,282 | B2 | 4/2017 | Sharma et al. |
| 10,878,576 | B2 * | 12/2020 | Han ................ G06N 3/08 |
| 2012/0179704 | A1 * | 7/2012 | Xu ................ G06F 16/355 |
| | | | 707/766 |
| 2016/0078359 | A1 | 3/2016 | Csurka et al. |
| 2016/0253466 | A1 | 9/2016 | Agaian et al. |
| 2017/0249739 | A1 | 8/2017 | Kallenberg et al. |
| 2017/0286805 | A1 * | 10/2017 | Yu ................ G06F 16/583 |
| 2018/0218502 | A1 * | 8/2018 | Golden ................ G06N 3/08 |
| 2018/0240235 | A1 * | 8/2018 | Mazo ................ G06N 3/04 |
| 2019/0057521 | A1 * | 2/2019 | Teixeira ................ G06N 3/0445 |
| 2019/0223725 | A1 * | 7/2019 | Lu ................ A61B 5/7267 |
| 2019/0361965 | A1 * | 11/2019 | Connell, II ........... G06T 7/0014 |
| 2019/0370965 | A1 * | 12/2019 | Lay ................ G06T 7/0012 |

OTHER PUBLICATIONS

Kaiser et al., "Learning to Remember Rare Events", International Conference on Learning Representations 2017, pp. 1-10, Mar. 9, 2017.

Finn et al., "Model-Agnostic Meta-Learning for Fast Adaptation of Deep Networks", International Conference on Machine Learning 2017, pp. 1-13, Mar. 9, 2017.

Kirkpatrick et al., "Overcoming catastrophic forgetting in neural networks", Proceedings of the National Academy of Sciences, vol. 114, Issue:13, pp. 3521-3526, Mar. 28, 2017.

Kamnitsas et al., "Unsupervised domain adaptation in brain lesion segmentation with adversarial networks", Computer Vision and Pattern Recognition, pp. 1-13, May 23, 2017.

Shankar et al., "Labeled Memory Networks for Online Model Adaptation", Association for the Advancement of Artificial Intelligence (AAAI) 2018, pp. 1-8, Jul. 5, 2017.

Rakelly et al., "Conditional Networks for Few-Shot Semantic Segmentation", International Conference on Learning Representations 2018, pp. 1-4, 2018.

"Tuberculosis Chest X-ray Image Data Sets", Communications Engineering Branch, Retrieved from: https://ceb.nlm.nih.gov/repositories/tuberculosis-chest-x-ray-image-data-sets/ On Jun. 8, 2018.

"Digital Image Database", Japanese Society of Radiological Technology, Retrieved from: http://db.jsrt.or.jp/eng.php On Jun. 8, 2018.

Cai Qi et al: "Memory Matching Networks for One-Shot Image Recognition", 2018 IEEE/CVF Conference on Computer Vision and Pattern Recognition, IEEE, Jun. 18, 2018 (Jun. 18, 2018), pp. 4080-4088, XP033476380, DOI:10.1109/CVPR.2018.00429; [retrieved on Dec. 14, 2018]; Section 3; figure 1.

Chu Wen-Hsuan et al: Learning Semantics—Guided Visual Attention for Few-Shot Image Classification , 2018 25th IEEE International Conference on Image Processing (ICIP), IEEE, Oct. 7, 2018 (Oct. 7, 2018), pp. 2979-2983, XP033454921, DOI: 10.1109/ICIP.2018.8451350 [retrieved on Aug. 29, 2018] Section 1, 2.2, 3, 4; figure 1.

PCT application PCT/US2019/055295 filed Oct. 9, 2019—International Search Report/Written Opinion dated Jan. 24, 2020; 12 pages.

Rahul Venkataramani et al: "Towards Continuous Domain adaptation for Healthcare", arxiv.org, Cornell University Library, 201 Olin Library Cornell University Ithaca, NY 14853, Dec. 4, 2018 (Dec. 4, 2018), XP080988806, the whole document; 5 pages.

Zitian Chen et al: "Multi-Level Semantic Feature Augmentation for One-Shot Learning", IEEE Transactions on Image Processing., vol. 28, No. 9, Oct. 2, 2018 (Oct. 2, 2018), pp. 4594-4605, XP055658758, US; ISSN: 1057-7149, DOI:10.1109/TIP.2019.2910052, Section III; figure 1.

* cited by examiner

SYSTEM AND METHOD FOR MEMORY AUGMENTED DOMAIN ADAPTATION

BACKGROUND

Embodiments of the present specification relate generally to machine learning, and more particularly to systems and methods for memory augmented continuous learning to adapt to a domain.

As will be appreciated, traditional machine learning techniques require a large dataset to "learn" via extensive training. Also, the machine learning techniques are typically trained using a dataset corresponding to a source domain. However, most statistical methods including machine learning techniques are known to perform rather poorly in rarely encountered scenarios/domains. In particular, many machine learning techniques including neural networks encounter the problem of domain adaptation and hence suffer from degradation of performance of a model on samples associated with a different but related domain. Problems in domain adaptation are typically attributed to diversity in the samples. This diversity in the samples is encountered even in controlled environments like medical imaging where training samples differ due to differences in equipment, demography, pathological conditions, protocol/operator variability, patients/subjects, and the like. Moreover, the problem with domain adaptation is further compounded by difficulty in obtaining voluminous data in healthcare and other regulated domains for training or retraining the models.

It is desirable that an algorithm/technique trained using data corresponding to a source domain adapts to a new target domain using as few samples as possible. Certain currently available solutions to the problem of domain adaptation entail enabling systems to learn from errors during deployment. One example approach calls for correcting the observed errors by retraining the existing technique with new samples. However, such approaches disadvantageously suffer from drawbacks. In one example, adapting the algorithm to the new target domain requires a large number of samples corresponding to the target domain. Also, in another example, neural networks suffer from a phenomenon known as "catastrophic forgetting."

Moreover, some presently available techniques use Memory Augmented Neural Networks (MANN) for remembering rare events. Certain other techniques use a few-shot learning method for adapting quickly to changes in either the domain or task through the meta-learning paradigm. However, most of these approaches disadvantageously rely on meta-learning from many classes.

BRIEF DESCRIPTION

In accordance with aspects of the present specification, a system is presented. The system includes an acquisition subsystem configured to obtain images corresponding to a target domain. Moreover, the system includes a processing subsystem in operative association with the acquisition subsystem and including a memory augmented domain adaptation platform, where the memory augmented domain adaptation platform is configured to compute one or more features corresponding to an input image, where the input image corresponds to a target domain, identify a set of support images based on the one or more features corresponding to the input image, where the set of support images corresponds to the target domain, augment an input to a machine-learnt model with a set of features, a set of masks, or both the set of features and the set of masks corresponding to the set of support images to adapt the machine-learnt model to the target domain, and generate an output based at least on the set of features, the set of masks, or both the set of features and the set of masks corresponding to the set of support images. Additionally, the system includes an interface unit configured to present the output for analysis.

In accordance with another aspect of the present specification, a processing system for adapting a machine-learnt model is presented. The processing system includes a memory augmented domain adaptation platform configured to compute one or more features corresponding to an input image, where the input image corresponds to a target domain, identify a set of support images based on the one or more features corresponding to the input image, where the set of support images corresponds to the target domain, augment an input to the machine-learnt model with a set of features, a set of masks, or both the set of features and the set of masks corresponding to the set of support images to adapt the machine-learnt model to the target domain, generate an output based at least on the set of features, the set of masks, or both the set of features and the set of masks corresponding to the set of support images, and provide the output to facilitate analysis.

In accordance with yet another aspect of the present specification, a method for adapting a machine-learnt model is presented. The method includes receiving an input image, where the input image corresponds to a target domain. Further, the method includes computing one or more features corresponding to the input image. Moreover, the method includes identifying a set of support images based on the one or more features corresponding to the input image, where the set of support images corresponds to the target domain. In addition, the method includes augmenting an input to the machine-learnt model with a set of features, a set of masks, or both the set of features and the set of masks corresponding to the set of support images to adapt the machine-learnt model to the target domain The method also includes generating an output based at least on the set of features, the set of masks, or both the set of features and the set of masks corresponding to the set of support images. Furthermore, the method includes outputting the output to facilitate analysis.

DRAWINGS

These and other features, aspects, and advantages of the present disclosure will become better understood when the following detailed description is read with reference to the accompanying drawings in which like characters represent like parts throughout the drawings, wherein:

FIGS. 4(*a*)-4(*c*) are diagrammatical representations of different datasets corresponding to different domains for use in the system and method for memory augmented domain adaptation, in accordance with aspects of the present specification.

DETAILED DESCRIPTION

The following description presents exemplary systems and methods for memory augmented domain adaptation. Particularly, embodiments described hereinafter present exemplary systems and methods that facilitate enhanced memory augmented continuous learning for adapting a machine-learnt model to a new domain to deliver better performance with a relatively small set of samples. For example, the systems and methods facilitate enhanced performance of tasks such as classification and segmentation when the machine-learnt model is deployed in a target domain using a small set of samples. Moreover, the systems and methods presented hereinafter provide an elegant solution to circumvent drawbacks associated with currently available methods. In particular, the systems and methods for memory augmented domain adaptation present a learning technique to adapt a machine-learnt model to newer domains with as few samples as possible. The newer samples associated with the deployed target domain are "remembered" so that the output generated by the present systems and methods is constantly evolving while circumventing any modifications to the base.

The systems and methods entail use of a "meta-learning" technique designed to enable improvements in the performance of the machine-learnt model when deployed in new domains In particular, the system includes a memory unit which acts like a programmable memory and is used to continuously learn and facilitate adaptation to a target domain using a small set of samples corresponding to the target domain Accordingly, when a similar case is subsequently encountered by the machine-learnt model, the memory unit is queried for a match. More particularly, the additional memory unit facilitates retrieval of samples similar to a particular use-case and the corresponding annotations. Furthermore, the annotations corresponding to the retrieved samples stored in the memory unit may be revised, thereby providing enhanced control over the subsequent predictions by the machine-learnt model. It may be noted that the terms domain and site may be used interchangeably.

For clarity, exemplary embodiments of the present systems and methods are described in the context of a medical imaging system. It may be noted that although the exemplary embodiments illustrated hereinafter are described in the context of a medical imaging system, other imaging systems and applications such as industrial imaging systems and non-destructive evaluation and inspection systems, such as pipeline inspection systems, liquid reactor inspection systems, are also contemplated. Some examples of the medical imaging system may include a computed tomography (CT) system, a single photon emission computed tomography system (SPECT) system, an X-ray imaging system, a magnetic resonance imaging (MRI) system, an optical imaging system, and/or an ultrasound imaging system. Additionally, the exemplary embodiments illustrated and described hereinafter may find application in multi-modality imaging systems that employ an X-ray imaging system in conjunction with other imaging modalities, position-tracking systems or other sensor systems. In one example, the multi-modality imaging system may include a positron emission tomography (PET) imaging system-X-ray imaging system. Furthermore, in other non-limiting examples of the multi-modality imaging systems, the X-ray imaging system may be used in conjunction with other imaging systems, such as, but not limited to, a computed tomography (CT) imaging system, a contrast enhanced ultrasound imaging system, an ultrasound imaging system, an optical imaging system, a magnetic resonance (MR) imaging system and other imaging systems, in accordance with aspects of the present specification. An exemplary environment that is suitable for practicing various implementations of the present system and methods is discussed in the following sections with reference to FIG. 1.

Figure 1:
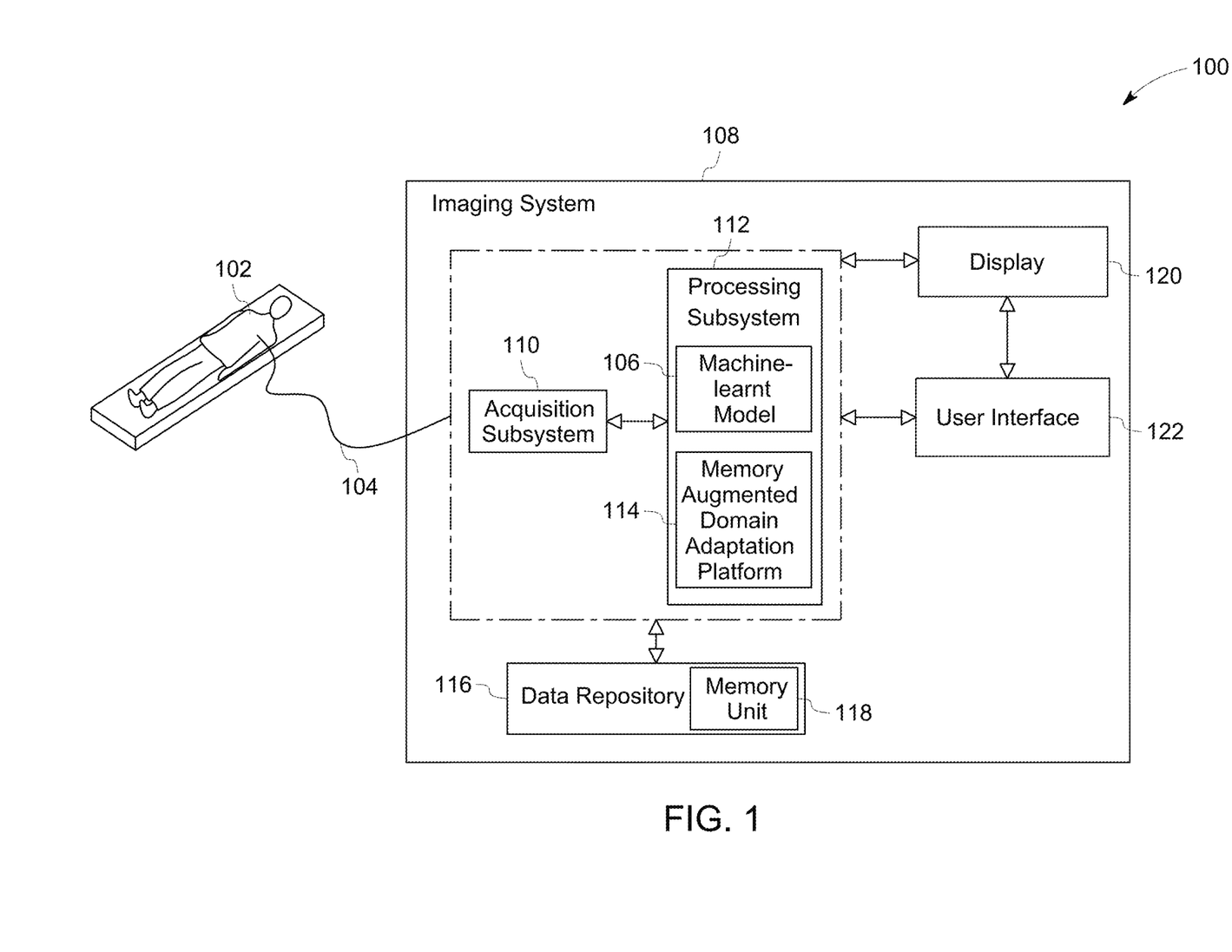
FIG. 1 is a schematic representation of an exemplary system for memory augmented domain adaptation, in accordance with aspects of the present specification.

FIG. 1 illustrates an exemplary imaging system 100 configured to receive and process an input image corresponding to a target domain corresponding to a target volume in a subject 102 such as a patient or a non-biological object to generate an output, where the output is used for further analysis. In particular, the system 100 is configured to use an exemplary memory augmented domain adaptation technique to adapt a machine-learnt model 106 to a target domain It may be noted that the machine-learnt model 106 is typically trained using a dataset corresponding to a source domain. The system 100 is configured to adapt the machine-learnt model 106 to the target domain using a relatively small set of samples corresponding to the target domain. In one embodiment, the imaging system 100 for example, may include an X-ray imaging system, a PET system, a SPECT system, a CT imaging system, an MRI system, a hybrid imaging system, and/or a multi-modality imaging system.

In one embodiment, the patient 102 may be suitably positioned, for example, on a table to allow the system 100 to image the target volume of the patient 102. During imaging, an image acquisition device 104 that is operatively coupled to a medical imaging system 108 may be used to acquire image data corresponding to an object or the target volume/region of interest in the patient 102. However, in certain other embodiments, the input image may be retrieved from a data storage.

Additionally, the medical imaging system 108 is configured to receive an input image or image data corresponding to the patient 102 and process the image data to generate an output corresponding to the patient 102. In a presently contemplated configuration, the system 100 may be configured to acquire image data representative of the patient 102. As noted hereinabove, in one embodiment, the system 100 may acquire image data corresponding to the patient 102 via the image acquisition device 104. Also, in one embodiment, the image acquisition device 104 may include a probe, where the probe may include an invasive probe, or a non-invasive or external probe, such as an external ultrasound probe, that is configured to aid in the acquisition of image data. Also, in certain other embodiments, image data may be acquired via one or more sensors (not shown) that may be disposed on the patient 102 or via use of other means of acquiring image data corresponding to the patient 102. By way of example, the sensors may include physiological sensors (not shown) such as positional sensors. In certain embodiments, the positional sensors may include electromagnetic field sensors or inertial sensors. These sensors may be operationally coupled to a data acquisition device, such as an imaging system, via leads (not shown), for example. Other methods of acquiring image data corresponding to the patient 102 are also contemplated.

Moreover, the medical imaging system 108 may include an acquisition subsystem 110 and a processing subsystem 112, in one embodiment. Further, the acquisition subsystem 110 of the medical imaging system 108 is configured to acquire image data or an input image representative of the patient 102 via the image acquisition device 104, in one embodiment. It may be noted that the terms image, image frames, and input image may be used interchangeably.

In addition, the acquisition subsystem 110 may also be configured to acquire images stored in an optical data storage article (not shown). It may be noted that the optical data storage article may be an optical storage medium, such as a compact disc (CD), a digital versatile disc (DVD), multi-layer structures, such as DVD-5 or DVD-9, multi-sided structures, such as DVD-10 or DVD-18, a high definition digital versatile disc (HD-DVD), a Blu-ray disc, a near field optical storage disc, a holographic storage medium, or another like volumetric optical storage medium, such as, for example, two-photon or multi-photon absorption storage format. Further, the 2D images so acquired by the acquisition subsystem 110 may be stored locally on the medical imaging system 108 in a data repository 116, for example.

Additionally, the image data acquired from the patient 102 may then be processed by the processing subsystem 112. The processing subsystem 112, for example, may include one or more application-specific processors, graphical processing units, digital signal processors, microcomputers, microcontrollers, Application Specific Integrated Circuits (ASICs), Field Programmable Gate Arrays (FPGAs), Programmable Logic Arrays (PLAs), and/or other suitable processing devices. Alternatively, the processing subsystem 112 may be configured to store the acquired image data and/or the user input in a data repository 116 and/or in a memory unit 118 for later use. In one embodiment, the data repository 116, for example, may include a hard disk drive, a floppy disk drive, a compact disk-read/write (CD-R/W) drive, a Digital Versatile Disc (DVD) drive, a flash drive, and/or a solid-state storage device.

It may be noted that the examples, demonstrations, and process steps that may be performed by certain components of the present system, for example by the processing subsystem 112, may be implemented by suitable code on a processor-based system. To that end, the processor-based system, for example, may include a general-purpose or a special-purpose computer. It may also be noted that different implementations of the present specification may perform some or all of the steps described herein in different orders or substantially concurrently.

According to aspects of the present specification, the image data acquired and/or processed by the medical imaging system 108 may be employed to perform one or more tasks. In one example, the processing subsystem 112 may include the machine-learnt model 106 such as a neural network that is configured to perform the tasks. In particular, the machine-learnt model 106 may be trained using a dataset corresponding to a source domain to perform the tasks. By way of a non-limiting example, the machine-learnt model 106 may be trained to classify the input image and/or segment one or more regions in the input image to aid a clinician in providing a diagnosis. In certain embodiments, the processing subsystem 112 may be further coupled to a storage system, such as the data repository 116, where the data repository 116 is configured to store the acquired image data. In certain embodiments, the data repository 116 may include a local database (not shown).

Moreover, in accordance with aspects of the present specification, the imaging system 100 may also include the memory unit 118. Although the configuration of FIG. 1 depicts the data repository 116 as including the memory unit 118, in other embodiments, the memory unit 118 may be a standalone unit that is external to the data repository 116 and/or the imaging system 100. The memory unit 118 is configured to store input images and outputs generated by the system 100.

As previously noted, the presently available techniques suffer from degraded performance of a machine-learnt model when the machine-learnt model is deployed in a new target domain. In accordance with aspects of the present specification, the imaging system 100 is designed to circumvent the shortcomings of the presently available techniques. More particularly, imaging system 100 includes a memory augmented domain adaptation platform 114 that is configured to aid in the automated adaptation of the machine-learnt model to a new target domain The exemplary system 100 that includes the memory augmented domain adaptation platform 114 provides a framework for deploying the machine-learnt model 106 in the target domain by enabling the machine-learnt model 106 to adapt to the target domain using a relatively small set of images corresponding to the target domain, which will in turn simplifies the clinical workflow. In particular, the memory augmented domain adaptation platform 114 works in conjunction with the machine-learnt model 106 to enhance the adaptability of the machine-learnt model 106 to the target domain, and thereby improve the performance of the imaging system 100. It may be noted that the terms "new domain," "target site," and "target domain" may be used interchangeably.

Also, in the presently contemplated configuration illustrated in FIG. 1, the processing subsystem 112 is shown as including the memory augmented domain adaptation platform 114. However, in certain embodiments, the memory augmented domain adaptation platform 114 may also be used as a standalone unit that is physically separate from the processing subsystem 112 and the medical imaging system 108. By way of example, the memory augmented domain adaptation platform 114 may be external to and operatively coupled to the medical imaging system 108.

The exemplary memory augmented domain adaptation platform 114 is configured to circumvent the shortcomings of the presently available domain adaptation techniques. More particularly, the memory augmented domain adaptation platform 114 is configured to facilitate adaptation of the machine-learnt model to a target domain using a small set of sample images corresponding to the target domain, thereby leading to consistent outcomes.

As previously noted, a given model is typically trained using the dataset corresponding to the source domain. It is desirable that the machine-learnt model 106, when deployed in the target domain adapts to the target domain, while maintaining the performance of the system 100. Accordingly, when the imaging system 100 is deployed in the target domain, the memory augmented domain adaptation platform 114 is configured to adapt the machine-learnt model 106 to the target domain to perform a given task. By way of example, the memory augmented domain adaptation platform 114 may be configured to aid the machine-learnt model in processing the acquired input image to classify the input image and/or segment one or more regions of interest in the input image.

Accordingly, in operation, the machine-learnt model 106 and/or the memory augmented domain adaptation platform 114 are configured to receive an input image, where the input image corresponds to the target domain Further, the memory augmented domain adaptation platform 114 is configured to compute one or more features corresponding to the input image. The features include shape features, texture features, and the like. In certain other embodiments, other features may be used to identify the set of support images. Some non-limiting examples of the other features include age of the patient 102, gender of the patient 102, electronic medical record (EMR) information corresponding to the patient 102, demography, and the like.

It may be noted that the memory unit 118 is configured to store one or more images corresponding to the target domain Additionally, the memory unit 118 may also be configured to store one or more features such as texture features and/or shape features and masks corresponding to the images of the target domain. Moreover, other features corresponding to the images of the target domain such as age, gender, EMR information, demography, and the like may be stored.

Moreover, subsequent to receipt of the input image, the memory augmented domain adaptation platform 114 is configured to query the data repository 116 and the memory unit 118 in particular to identify a matching set of images based on the features of the input image. In one example, consequent to the query, the memory augmented domain adaptation platform 114 may identify a set of support images in the memory unit 118 based on the image features corresponding to the input image. It may be noted that in accordance with aspects of the present specification, in certain embodiments, the system 100 may be configured to allow a clinician to identify the set of support images.

It may be noted that the set of support images corresponds to the target domain and may be a subset of images corresponding to the target domain. In one non-limiting example, the set of support images includes images in a range from about three images to about five images. However, use of other number of images in the set of support images is also contemplated. More particularly, a small subset of the target domain images may be used as the set of support images. Use of the small subset of the target domain images as the set of support images aids in circumventing the need for use of a large pool/set of training data by the currently available techniques.

Traditionally, the currently available techniques provide only the input image to the machine-learnt model to perform a given task. In accordance with aspects of the present specification, the memory augmented domain adaptation platform 114 is configured to augment an input to the machine-learnt model 106 with the set of support images. In particular, the memory augmented domain adaptation platform 114 is configured to compute a set of features and/or a set of masks corresponding to the set of support images and provide the set of features and/or set of masks as additional input to the machine-learnt model 106 to adapt the machine-learnt model 106 to the target domain. Consequently, the machine-learnt model 106 "adapts" or "learns" the target domain using the small set of support images.

Moreover, the memory augmented domain adaptation platform 114 aids in the generation of an output by the machine-learnt model 106 based at least on the set of features and/or set of masks corresponding to the set of support images. Furthermore, the memory augmented domain adaptation platform 114 is configured to provide the output to facilitate analysis. Also, the output generated may be based on the task performed by the machine-learnt model 106. For example, if the machine-learnt model 106 is configured to classify the input image, the output may be a binary value. However, if the machine-learnt model 106 is configured to segment the input image, the output may be an image corresponding to the segmented region(s) of interest. Moreover, in one example, the output may be visualized on an interface unit such as a display 120.

Furthermore, as illustrated in FIG. 1, the medical imaging system 108 may include the display 120 and a user interface 122. In certain embodiments, such as in a touch screen, the display 120 and the user interface 122 may overlap. Also, in some embodiments, the display 120 and the user interface 122 may include a common area. In accordance with aspects of the present specification, the display 120 of the medical imaging system 108 may be configured to display or present the output generated by the machine-learnt model 106. Moreover, any quality metrics/indicators generated by the memory augmented domain adaptation platform 114 may also be visualized on the display 120.

In addition, the user interface 122 of the medical imaging system 108 may include a human interface device (not shown) configured to aid the clinician in manipulating image data displayed on the display 120. The human interface device may include a mouse-type device, a trackball, a joystick, a stylus, or a touch screen configured to facilitate the clinician to identify the one or more regions of interest in the images. However, as will be appreciated, other human interface devices, such as, but not limited to, a touch screen, may also be employed. Furthermore, in accordance with aspects of the present specification, the user interface 122 may be configured to aid the clinician in navigating through the acquired images and/or output generated by the medical imaging system 108. Additionally, the user interface 122 may also be configured to aid in manipulating and/or organizing the displayed images and/or generated indicators displayed on the display 120.

Implementing the imaging system 100 that includes the memory augmented domain adaptation platform 114 as described hereinabove aids in enhancing the performance of the machine-learnt model 106 when the model 106 is deployed in a new target domain In particular, the memory augmented domain adaptation platform 114 aids in facilitating the adaptation of the machine-learnt model 106 to the target domain via use of the small set of support images. Additionally, the memory augmented domain adaptation platform 114 provides continuous learning to the machine-learnt model 106 via use of the set of support images, thereby improving the performance of the machine-learnt model 106 when the model 106 is deployed in new target domains.

Figure 2:
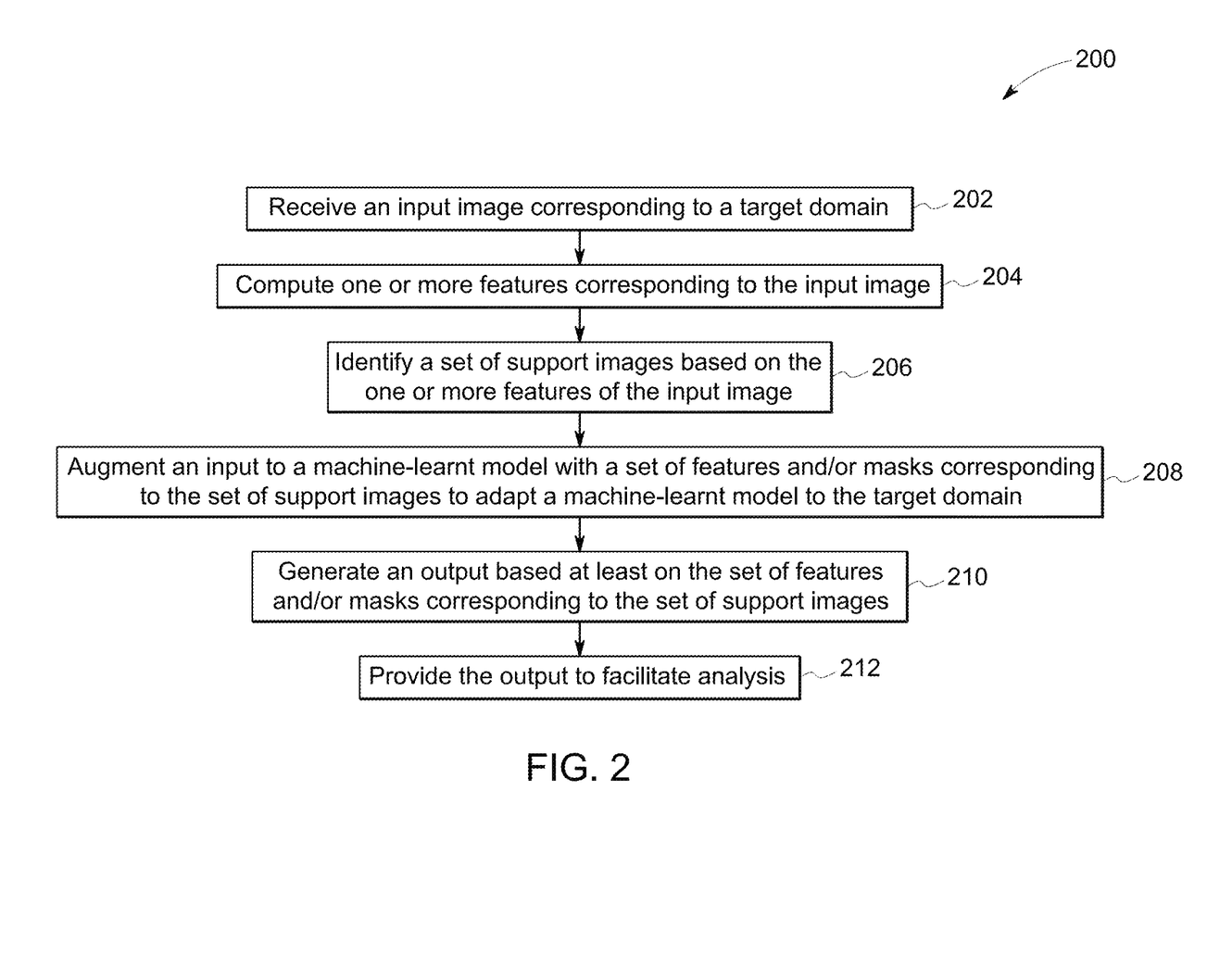
FIG. 2 is a flow chart of an exemplary method for memory augmented domain adaptation, in accordance with aspects of the present specification.
Figure 3:
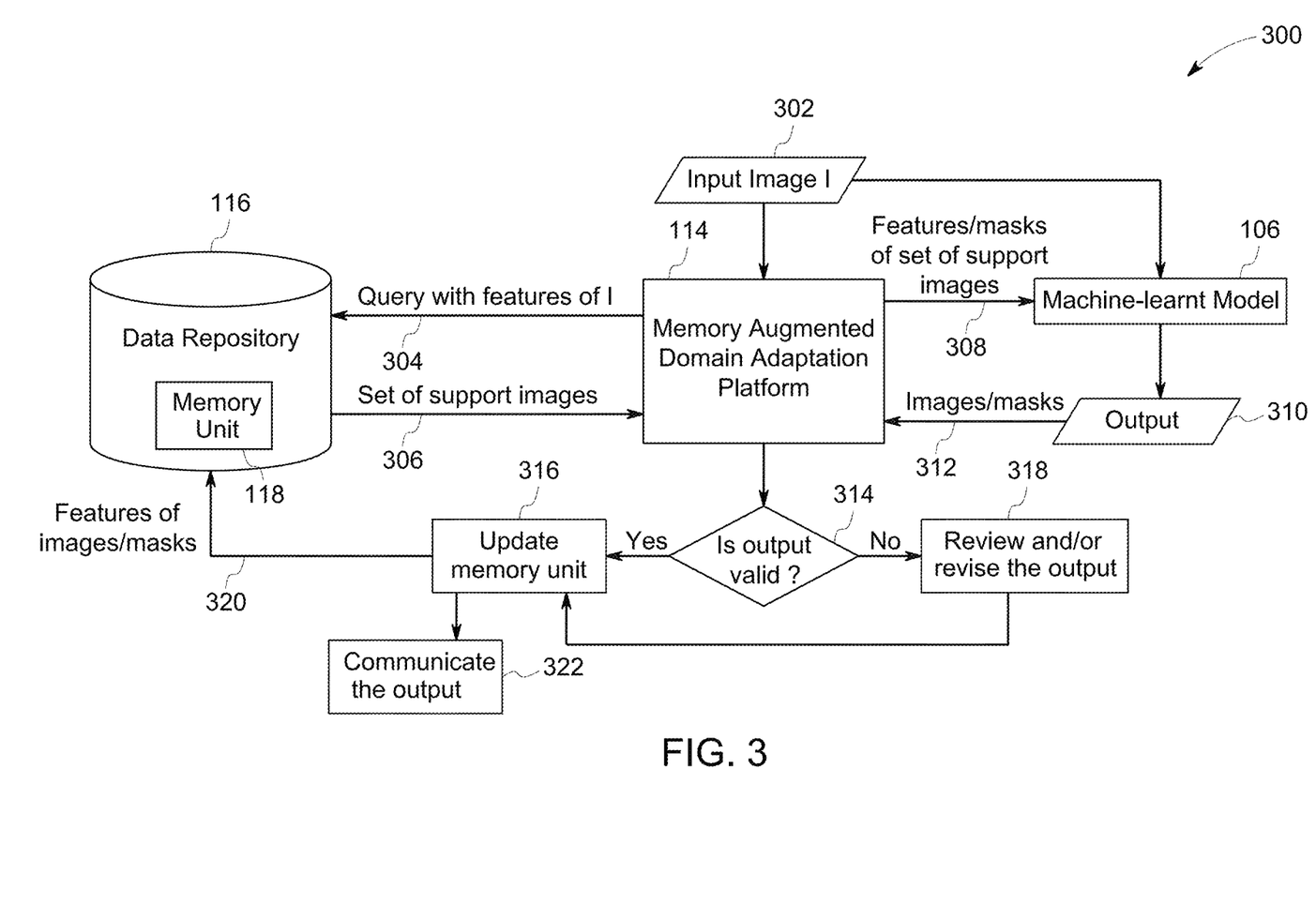
FIG. 3 is a schematic representation illustrating an exemplary method for memory augmented domain adaptation, in accordance with aspects of the present specification.

In the present specification, embodiments of exemplary methods of FIGS. 2-3 may be described in a general context of computer executable instructions on a computing system or a processor. Generally, computer executable instructions may include routines, programs, objects, components, data structures, procedures, modules, functions, and the like that perform particular functions or implement particular abstract data types.

Additionally, embodiments of the exemplary methods of FIGS. 2-3 may also be practiced in a distributed computing environment where optimization functions are performed by remote processing devices that are linked through a wired and/or wireless communication network. In the distributed computing environment, the computer executable instructions may be located in both local and remote computer storage media, including memory storage devices.

Further, in FIGS. 2-3, the exemplary methods are illustrated as a collection of blocks in a logical flow chart, which represents operations that may be implemented in hardware, software, or combinations thereof. The various operations are depicted in the blocks to illustrate the functions that are performed. In the context of software, the blocks represent computer instructions that, when executed by one or more processing subsystems, perform the recited operations.

The order in which the exemplary methods of FIGS. 2-3 are described is not intended to be construed as a limitation, and any number of the described blocks may be combined in any order to implement the exemplary methods disclosed herein, or equivalent alternative methods. Additionally, certain blocks may be deleted from the exemplary methods or augmented by additional blocks with added functionality without departing from the spirit and scope of the subject matter described herein. Although, the exemplary embodiments illustrated hereinafter are described in the context of a medical imaging system, it will be appreciated that use of the systems and methods in industrial applications is also contemplated in conjunction with the present specification.

Referring now to FIG. 2, a flow chart 200 depicting an exemplary method for adapting a machine-learnt model to a target domain is presented. The method 200 of FIG. 2 is described with reference to the components of FIG. 1. In one embodiment, the method 200 may be performed by the memory augmented domain adaptation platform 114 in conjunction with the machine-learnt model 106.

The method includes receiving an input image, when the imaging system 100 and the machine-learnt model 106 in particular is deployed in the target domain, as indicated by step 202. The input image corresponds to a target domain Also, the input image may be received by the machine-learnt model 106 and the memory augmented domain adaptation platform 114.

Further, at step 204, one or more features corresponding to the input image are computed, by the memory augmented domain adaptation platform 114. These features may include texture features, shape features, or a combination thereof. Some non-limiting examples of the texture features include wavelet features, machine-learnt features and the like. Also, some non-limiting examples of the shape features include contour-based features, features derived from dictionary-based approaches, moments, shape representations such as area, tangent angles, contour curvature, shape transform domain features such as Fourier transforms, and the like. Also, as previously noted, some examples of other features include age, gender, EMR information of the patient, and the like.

It may be noted that images corresponding to the target domain may be stored in the memory unit 118. Subsequent to the computation of the image features corresponding to the input image, a set of support images may be identified by the memory augmented domain adaptation platform 114 based on the image features of the input image, as indicated by step 206. In particular, the memory augmented domain adaptation platform 114 is configured to query the memory unit 118 using the image features corresponding to the input image to identify the set of support images from the images stored in the memory unit 118. It may be noted that the set of support images is a subset of the images corresponding to the target domain In one non-limiting example, the set of support images includes images in a range from about three images to about five images. Further, in a scenario where the query to the memory unit 118 fails to identify one or more support images, one or more images corresponding to the source domain may be used as the support images.

Conventional machine-learning techniques generate an output based solely on the received input image, thereby leading to degradation of performance of the machine-learnt model in a new domain. In accordance with aspects of the present specification, the shortcomings of the presently available techniques are circumvented via use of the retrieved set of support images. The set of support images is used by machine-learnt model 106 to provide a context for the prediction as opposed to using only the input image.

More particularly, the method includes augmenting an input to the machine-learnt model with a set of features and/or set of masks corresponding to the set of support images to adapt the machine-learnt model to the target domain, as depicted by step 208. Accordingly, the memory augmented domain adaptation platform 114 is configured to compute one or more features and/or masks corresponding to the retrieved set of support images. In one example, a tunable feature extraction suited for segmentation may be used to compute the features corresponding to the set of support images. In another example, a support context vector augmentation may be used to compute the features corresponding to the set of support images. In yet another example, the features corresponding to the set of support images may be computed by mimicking settings corresponding to a target domain during the training phase of the machine-learnt model 106 with data corresponding to the source domain.

As previously noted, these features may include texture features and/or shape features corresponding to the set of support images. Subsequently, the memory augmented domain adaptation platform 114 provides the features and/or masks corresponding to the set of support images as additional input to a predictor of the machine-learnt model 106, thereby augmenting the input to the machine-learnt model 106. Moreover, other features may also be provided as additional input to the predictor of the machine-learnt model 106, as previously noted.

Furthermore, at step 210, the machine-learnt model 106 is configured to generate an output based at least on the set of features and/or set of masks corresponding to the set of support images provided by the memory augmented domain adaptation platform 114 and the input image. The output generated by the machine-learnt model 106 may vary based on the task performed by the machine-learnt model 106. By way of example, if the machine-learnt model 106 is used to perform a classification task, the output generated by the machine-learnt model 106 may be a binary value. In a similar fashion, if the machine-learnt model 106 is used to perform a segmentation task, the output generated by the machine-learnt model 106 may be a mask or a segmented image.

Furthermore, the output may be utilized to facilitate analysis, as indicated by step 212. By way of example, the memory augmented domain adaptation platform 114 may be configured to visualize the mask or segmented image and/or the binary value generated by the machine-learnt model 106 on the display 120. In certain embodiments, a visual comparison the performance of the system 100 with and without domain adaptation may be visualized on the display 120 to aid the clinician in any diagnosis or analysis. Additionally, any metrics associated with the output may also be visualized on the display 120. In certain embodiments, the metrics may be superimposed on a corresponding output on the display 120.

In another example, the memory augmented domain adaptation platform 114 may also be configured to communicate the generated output to a user such as a clinician or another system. The clinician and/or another system may use the output to facilitate a diagnosis and/or an analysis. The method 200 will be described in greater detail with reference to FIG. 3.

Turning now to FIG. 3, a schematic representation 300 illustrating the exemplary method for memory augmented domain adaptation of FIG. 2 is depicted. Also, FIG. 3 is described with reference to the components of FIG. 1-2.

As previously noted, the machine-learnt model 106 is typically trained using a dataset corresponding to a source domain. Once the machine-learnt model 106 is deployed in a new target domain, the exemplary memory augmented domain adaptation platform 114 is configured to adapt the machine-learnt model 106 to the target domain using a relatively small set of support images. In one non-limiting example, the set of support images may include images in a range from about three images to about five images.

Further, as depicted in FIG. 3, an input image 302 corresponding to a target domain is received by a machine-learnt model 106 and the memory augmented domain adaptation platform 114. Subsequently, the memory augmented domain adaptation platform 114 computes one or more features 304 corresponding to the input image 302. These features include texture features, shape features, and/or other features.

Moreover, the memory augmented domain adaptation platform 114 is configured to identify a set of support images corresponding to the target domain using the computed features associated with the input image 302. Accordingly, the memory augmented domain adaptation platform 114 is configured to query the memory unit 118 based on the features corresponding to the input image 302 to identify existence of a match in the memory unit 118. Specifically, the memory augmented domain adaptation platform 114 is configured to identify a set of support images based on the one or more image features corresponding to the input image 302. The set of support images corresponds to the target domain and include features that match the features of the input image 302.

It may be noted that in a classical U-Net, given training pairs of images and segmentation masks $\{I_k, S_k\}$, k=1, 2, . . . , N, a framework learns a predictor $\widehat{S_w}[\cdot]$ defined by parameters w that minimizes a training loss. One such example is presented in equation (1).

$$RMSE = \frac{1}{N}\sum_{k=1}^{N} |S_x - \widehat{S_w}[I_k]|^2 \quad (1)$$

where $\widehat{S_w}[\cdot]$ is a learnt predictor and is a composition of an encoder and decoder $D_w \cdot E_w$.

In accordance with aspects of the present specification, a memory unit M such as the memory unit 118 is provided. The memory unit M 118 is defined by a matrix $T_{N \times Ft}$, where $F_t$ is a feature length representing the texture features and a matrix $G_{N \times Fs}$, where $F_s$ is a feature length representing the shape features. In one example, the memory unit M 118 is defined as:

$$M = (T_{N \times Ft}, G_{N \times Fs}) \quad (2)$$

In response to the query, for every input image $I_k$, the memory unit M 118 is configured to return a set of support images $S(I_k)$ 306. One example of the set of support images $S(I_k)$ 306 is presented in equation (3).

$$S(I_k) = p_t, \{t=1, 2, \ldots, T\} \quad (3)$$

In one example, in equation (1), T is a constant and is representative of a number of images in the set of support images $S(I_k)$ 306. As previously noted, the set of support images $S(I_k)$ 306 corresponds to the target domain and is a subset of images corresponding to the target domain. In one non-limiting example, the set of support images includes images in a range from about three images to about five images. However, use of other number of images in the set of support images is also contemplated.

For a given image $I_k$, the set of support images $S(I_k)$ 306 is computed as:

$$(s_1, s_2, \ldots, s_T) = NN_T(q(I_k), M) \quad (4)$$

where q is a feature corresponding to the input image $I_k$ and $NN_T$ are the T nearest neighbors for the given input $q(I_k)$.

The nearest neighbor operator NN is defined as:

$$A = NN(I_k, M) = \mathrm{argmax}_i q(I_k) \cdot q(M_i) \quad (5)$$

The memory unit 118 functions like a programmable memory and is used to facilitate adaptation and continuous learning of the machine-learnt model 106 to the target domain using a small set of support images corresponding to the target domain. Hence, when a similar case is subsequently encountered by the machine-learnt model 106, the memory unit 106 is queried for a match. More particularly, the additional memory unit 118 facilitates retrieval of support images/samples similar to a particular use-case and the corresponding annotations.

In addition, the memory augmented domain adaptation platform 114 is configured to augment an input to the machine-learnt model 106 with the set of support images $S(I_k)$ 306. The set of support images $S(I_k)$ 306 is used by machine-learnt model 106 to provide a context for the prediction as opposed to using only the input image. More particularly, the memory augmented domain adaptation platform 114 is configured to compute a set of features and/or set of masks 308 corresponding to the set of support images $S(I_k)$ 306. As previously noted with reference to FIG. 2, different methods may be used to compute the features/masks 308 corresponding to the set of support images $S(I_k)$ 308.

Further, the memory augmented domain adaptation platform 114 is configured to provide the set of features and/or set of masks 308 corresponding to the set of support images $S(I_k)$ 306 as additional input to the machine-learnt model 106 to adapt the machine-learnt model 106 to the target domain More particularly, in the machine-learnt model 106 (for example, a support augmented neural network), the input to a predictor F of the machine-learnt model 106 is augmented with a set of texture and/or shape features and set of masks 308 corresponding to the set of support images $S(I_k)$ 306. Moreover, the set of support images $S(I_k)$ 306 is used by the machine-learnt model 106 to provide a context for the prediction as opposed to using only the input image 302. The texture and shape features are defined by:

$$\text{Texture Features T: } I_k \rightarrow T_{Ft \times 1} \quad (6)$$

$$\text{Shape Features G: } S_k \rightarrow T_{Fs \times 1} \quad (7)$$

More particularly, the input to the decoder of the predictor F is changed to be a combination of the learnt encoded input $E(I_k)$ and the shape and/or texture features and/or masks 308 corresponding to the set of support images $S(I_k)$ 306. By way of example, the memory augmented domain adaptation platform 114 is configured to provide as input to the machine-learnt model 106 one or more machine-learnt features, one or more hard-coded features, masks 308 corresponding to the set of support images $S(I_k)$ 306, or combinations thereof.

Additionally, the machine-learnt model 106 is configured to perform a desired task, such as but not limited to, a segmentation task and a classification task. Accordingly, the machine-learnt model 106 is configured to generate a modified output 310 based at least on the set of features and/or set of masks 308 corresponding to the set of support images $S(I_k)$ 306. In one example, the output 310 includes a segmented image/mask, a binary value, or a combination thereof 312. Also, in one example, the modified output 310 generated by the machine-learnt model 106 is represented as:

$$\widehat{ST}_K = D \cdot (E[I_k] \circledast T[I_k] \circledast G[I_k]) \quad (8)$$

where ⊛ is an operator such as, but not limited to, concatenation, average, sum, and the like and is used to combine the different features and/or masks.

The masks/images and/or binary values 312 generated as output by the machine-learnt model 106 are communicated to the memory augmented domain adaptation platform 114). Additionally, the memory augmented domain adaptation platform 114 is configured to facilitate continuous learning of the machine-learnt model 106. Accordingly, the memory augmented domain adaptation platform 114 is configured to verify validity of the output 310 (step 314). At step 314, if it is verified that the output 310 is valid, the memory unit 118 is updated to store the output 310 (step 316). In particular, at step 316, one or more features and/or one or more masks 320 corresponding to the set of support images $S(I_k)$ 306 are stored in the memory unit 118. It may be noted that the features and/or masks 320 are tuned for performing tasks such as, but not limited to classification and segmentation.

However, at step 314, if the validity of the output 310 is not verified, one or more annotations corresponding to the set of support images $S(I_k)$ 306 may be revised to generate a set of revised support images (step 318). Subsequently, the memory unit 118 is updated with the set of revised support images and features and/or masks corresponding to the set of revised support images. This validation and updating of the memory unit 118 aids in facilitating the continuous learning of the machine-learnt model 106, thereby enhancing the domain adaptation capability of the machine learnt model 106.

In certain embodiments, the memory augmented domain adaptation platform 114 may also be configured to update the memory unit 118 to optimize the memory unit M 118. By way of example, the memory augmented domain adaptation platform 114 may delete one or more support images of the set of support images $S(I_k)$ 306 based on relevance of the set of support images $S(I_k)$ 306 to optimize the memory unit M 118, while enabling enhanced performance of the imaging system 100. By way of example, to track the relevance of a support image 306, the memory augmented domain adaptation platform 114 may be configured to monitor the number of times that support image 306 is used for prediction, check the age of the support image 306 in the memory unit 118, determine the similarity of the support image 306 to other images in the memory unit 118, and the like.

Furthermore, the memory augmented domain adaptation platform 114 is configured to provide or communicate the output 310 to facilitate analysis (step 322). In one non-limiting example, the output 310 may be visualized on an interface unit such as the display 120. The output 310 may be used for providing a diagnosis or for further analysis.

Implementing the memory augmented domain adaptation platform 114 as described hereinabove aids in adapting the machine-learnt model 106 to the target domain while circumventing the need for retraining the machine-learnt model 106. In addition, since the machine-learnt model 106 is adapted to the target domain using a small set of support images 306, the need for a voluminous dataset corresponding to the target domain to retrain the machine-learnt model 106 is obviated. Moreover, the machine-learnt model 106 is continuously trained using the set of support images 306 that is stored in the memory unit 118 and provided by the memory augmented domain adaptation platform 114, thereby further enhancing the adaptation of the machine-learnt model 106 to the target domain.

Figure 4A:
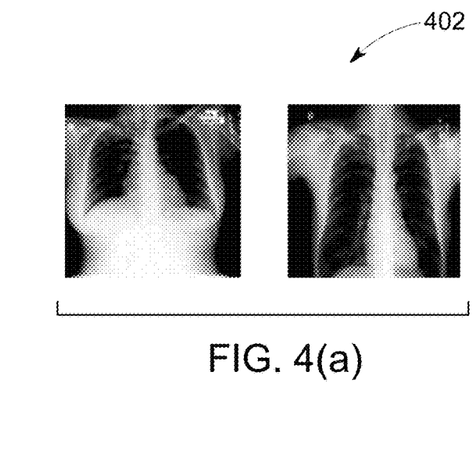
Figure 4B:
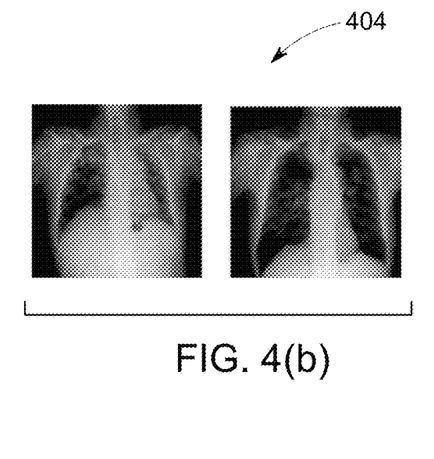
Figure 4C:
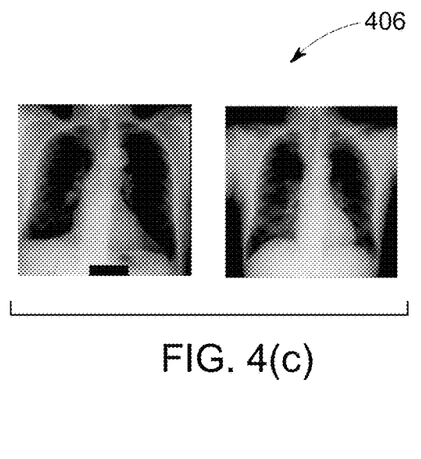

Referring now to FIGS. 4(a)-4(c), diagrammatical representations of different datasets 402, 404, 406 corresponding to different domains are presented. In particular, these datasets 402, 404, 406 correspond to different domains with subjects having different diseases to simulate a deployment scenario of a machine-learnt model. Also, FIGS. 4(a)-4(c) are described with reference to the components of FIG. 1-3. It may be noted that in the present example, the datasets 402, 404, 406 include X-ray images corresponding to three different domains. Additionally, the samples such as the X-ray images corresponding to the three datasets 402, 404, 406 have variations in texture, disease conditions, and gender. In the example depicted in FIGS. 4(a)-4(c), use of the machine-learnt model to perform a lung segmentation task from X-ray images is represented. As will be appreciated, lung segmentation is considered a challenging task owing to variations in the lung due to variations in anatomy, diseases, and the like amongst different patients. The three datasets 402, 404, 406 are used to understand the effect of changes in domains on the performance of the machine-learnt model. A U-Net is employed as a base learning model.

FIG. 4(a) depicts a first dataset 402. In the present example, the first dataset 402 is a Montgomery TB dataset. The Montgomery TB dataset 402 is an open source NHS dataset and includes 138 posterior-anterior X-ray images. Of these images, 80 X-ray images are indicative of normal data and 58 X-ray images are representative of abnormal data with manifestations of tuberculosis. Moreover, in the present example, the Montgomery TB dataset 402 is a source dataset used to train the machine-learnt model 106.

Further, FIG. 4(b) depicts a second dataset 404. The second dataset 404 is a GE pneumoconiosis dataset. The GE pneumoconiosis dataset 404 includes 330 images with lung mask annotations. It may be noted that pneumoconiosis is an occupational lung disease that typically affects factory workers and early stages of the diseases can be detected by dust and other metal settlements in the lungs. In the present example, the GE pneumoconiosis dataset 404 corresponds to a first target domain.

Moreover, FIG. 4(c) illustrates a third dataset 406. The third dataset 406 is a Japanese Society of Radiological Technology (JSRT) dataset. The JSRT dataset 406 includes chest X-rays with lung nodules. Also, the JSRT dataset 406 includes 247 images. In the present example, the JSRT dataset 406 corresponds to a second target domain In addition, to demonstrate the effectiveness of use of the memory augmented domain adaptation platform 114, the machine-learnt model 106 is trained using samples obtained exclusively from the Montgomery TB dataset 402. Once the machine-learnt model 106 is trained using samples from the Montgomery TB dataset 402, the machine-learnt model 106 is deployed in new target domains to test the adaptability of the machine-learnt model 106 to the target domains using samples from corresponding target domains In one example, the trained machine-learnt model 106 is deployed in new target domains and the domain adaptation of the machine-learnt model 106 is tested using samples corresponding to the GE pneumoconiosis dataset 404 and the JSRT dataset 406. The results are validated using a Dice score.

Table 1 presents a comparison of domain adaptation performance of various machine-learnt models using the datasets 402, 404, 406 of FIGS. 4a)-4(c). Column 1 of Table 1 lists the techniques used in the comparative study. Further, column 2 of Table 1 corresponds to the source dataset 402

(Montgomery TB dataset). Also, column 3 of Table 1 corresponds to the first target dataset 404 (GE pneumoconiosis dataset). Column 4 of Table 1 corresponds to the second target dataset 406 (JSRT dataset). Moreover, row 1 of Table 1 corresponds to the performance of a base technique or learning model (U-Net) in the three domains 402, 404, 406. Similarly, a second row of Table 1 of corresponds to the performance of the method for adapting the machine-learnt model 106 (SupportNet) described hereinabove in the three domains 402, 404, 406. It may be noted that for the results presented in in row 2 of Table 1, the augmented input provided by the memory augmented domain adaptation platform 114 to the machine-learnt model 106 includes only the set of features corresponding to the set of support images. Additionally, row 3 of Table 1 corresponds to the performance of the present method (SupportNet) in the three domains 402, 404, 406. It may be noted that in row 3 of Table 1, the augmented input provided by the memory augmented domain adaptation platform 114 to the machine-learnt model 106 includes the set of features and/or set of masks corresponding to the set of support images.

TABLE 1

| Technique | Montgomery | Pneumoconiosis | JSRT |
|---|---|---|---|
| U-Net | 0.968 | 0.882 | 0.896 |
| SupportNet using a support set of features | 0.958 | 0.910 | 0.918 |
| SupportNet using a support set of features and masks | 0.959 | 0.947 | 0.964 |

Moreover, the results presented in Table 1 are obtained using a Dice score of 1 as a metric. Based on the results presented in Table 1, it may be deduced that the performance of the SupportNet (see rows 2 and 3) that uses the augmented input of support features and support masks is better than the performance of the U-Net (see row 1) on images obtained from different cohorts/domains. Accordingly, the SupportNet enjoys better generalization than the U-Net.

Turning now to FIGS. 5(a)-5(e), diagrammatic illustrations of a comparison of results of the domain adaptation performance of different machine-learnt models presented in Table 1 to perform a desired task are depicted. In the example presented in FIGS. 5(a)-5(e), it is desirable to use the machine-learnt model 106 to segment the lung region in the input image 502. Also, FIGS. 5(a)-5(e) are described with reference to the components of FIGS. 1-4.

Figure 5A:
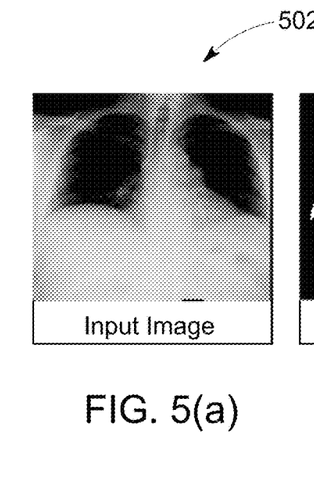
FIGS. 5(a)-5(e) are diagrammatical representations of a comparison of performance of different methods domain adaptation, in accordance with aspects of the present specification.
Figure 5B:
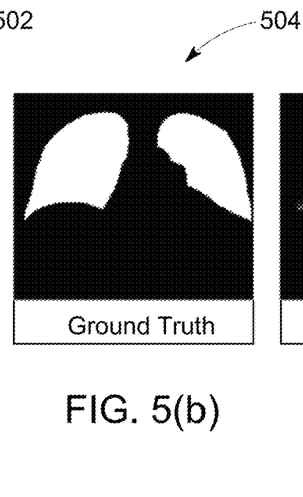

FIG. 5(a) represents an input image 502 such as the input image 302 of FIG. 3. Further, FIG. 5(b) represents a ground truth mask 504. In one example, the image 504 may include ground truth annotation by a clinician.

Figure 5C:
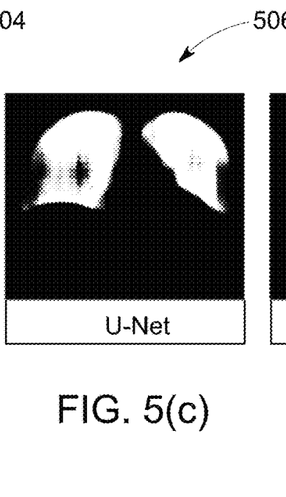
Figure 5D:
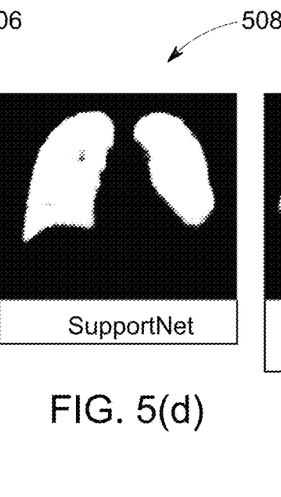
Figure 5E:
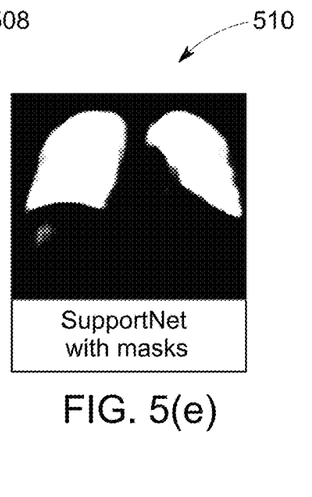

Also, FIG. 5(c) represents a segmented image 506 generated using a baseline technique such as the U-net without domain adaptation. Similarly, FIG. 5(d) represents a segmented image 508 generated by the SupportNet using only features corresponding to a set of support images. Also, FIG. 5(e) represents a segmented image 510 generated by the SupportNet using features and masks corresponding to a set of support images.

It may be noted that using only the features from the set of support images corresponding to the nearest neighbors aids the SupportNet with a suitable feature prior. In addition, when the features from the set of support images are augmented with the masks from the set of support images, the machine-learnt model achieves the dual objectives of balancing the shape as well as providing high fidelity to the images.

Embodiments of the present systems and methods for memory augmented domain adaptation advantageously present a continuous learning-based technique to adapt a machine-learnt model to a target domain to deliver better performance with a small set of samples. Moreover, the output generated by present systems and methods facilitates enhanced understanding of the predictions by comparing a set of similar examples used for arriving at a decision. Moreover, the systems and methods enable domain adaptation and continuous learning of the machine-learnt model without the constraint of requiring a large dataset of target domain samples during a development phase of the technique. In particular, the systems and methods enable domain adaptation with a very small set of samples.

Additionally, the systems and methods entail use of a "meta-learning" technique designed to enable improvements in the performance of the machine-learnt model when deployed in new domains. In particular, the memory unit is used to facilitate adaptation and continuous learning of the machine-learnt model to a target domain using a small set of samples corresponding to the target domain. Accordingly, when a similar case is subsequently encountered by the machine-learnt model, the memory unit is queried for a match. More particularly, the additional memory unit facilitates retrieval of samples similar to a particular use-case and the corresponding annotations. Furthermore, the annotations corresponding to the retrieved samples stored in the memory unit may be revised, thereby providing enhanced control over the subsequent predictions by the machine-learnt model.

It may be noted that the foregoing examples, demonstrations, and process steps that may be performed by certain components of the present systems, for example by the processing subsystem 112 and the memory augmented domain adaptation platform 114 in particular, may be implemented by suitable code on a processor-based system. The processor-based system, for example, may include a general-purpose or a special-purpose computer. It may also be noted that different implementations of the present specification may perform some or all of the steps described herein in different orders or substantially concurrently.

Additionally, the functions may be implemented in a variety of programming languages, including but not limited to Ruby, Hypertext Preprocessor (PHP), Perl, Delphi, Python, C, C++, or Java. Such code may be stored or adapted for storage on one or more tangible, machine-readable media, such as on data repository chips, local or remote hard disks, optical disks (that is, CDs or DVDs), solid-state drives, or other media, which may be accessed by the processor-based system to execute the stored code.

Although specific features of embodiments of the present specification may be shown in and/or described with respect to some drawings and not in others, this is for convenience only. It is to be understood that the described features, structures, and/or characteristics may be combined and/or used interchangeably in any suitable manner in the various embodiments.

While only certain features of the present disclosure have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
an acquisition subsystem configured to obtain images corresponding to a target domain;

a processing subsystem in operative association with the acquisition subsystem and comprising a memory augmented domain adaptation platform, wherein the memory augmented domain adaptation platform is configured to:
  compute one or more features corresponding to an input image, wherein the input image corresponds to a target domain;
  identify a set of support images based on the one or more features corresponding to the input image, wherein the set of support images corresponds to the target domain;
  augment an input to a machine-learnt model with a set of features corresponding to the set of support images to adapt the machine-learnt model from its trained source domain to the target domain; wherein the features corresponding to the set of support images are computed by mimicking settings corresponding to a target domain during the training phase of the machine-learnt model with data corresponding to the source domain;
  generate an output based on the input image and the target domain and the set of features corresponding to the set of support images; and
an interface unit configured to present the output for analysis.

2. The system of claim 1, wherein the machine-learnt model is configured to at least perform classification, segmentation, or both classification and segmentation of the input image.

3. The system of claim 1, wherein the one or more features corresponding to the input image and the set of features corresponding to the set of support images comprise shape features, texture features, or both shape features and texture features.

4. The system of claim 1, wherein the memory augmented domain adaptation platform is configured to store one or more features corresponding to the set of support images, and wherein the one or more features are tuned for performing classification, segmentation, or both classification and segmentation in a memory unit.

5. The system of claim 1, wherein to identify the set of support images, the memory augmented domain adaptation platform is configured to query a memory unit to determine the set of support images based on the one or more features corresponding to the input image.

6. The system of claim 1, wherein to augment the input to the machine-learnt model, the memory augmented domain adaptation platform is configured to provide as input to the machine-learnt model one or more machine-learnt features, one or more hard-coded features, or combinations thereof.

7. The system of claim 1, wherein to generate the output for a classification task, the memory augmented domain adaptation platform is configured to generate a binary value.

8. The system of claim 1, wherein the memory augmented domain adaptation platform is further configured to:
  verify validity of the output;
  revise one or more annotations corresponding to the set of support images based on the validity of the output to generate a set of revised support images; and
  update the memory unit by storing the set of revised support images and features corresponding to the set of revised images.

9. The system of claim 1, the memory augmented domain adaptation platform is further configured to adapt the machine-learnt model from a source domain to the target domain without retraining the machine-learnt model.

10. The system of claim 1, wherein the set of support images comprises images in a range from three images to five images.

11. A processing system for adapting a machine-learnt model, comprising:
  a memory augmented domain adaptation platform configured to:
    compute one or more features corresponding to an input image, wherein the input image corresponds to a target domain;
    identify a set of support images based on the one or more features corresponding to the input image, wherein the set of support images corresponds to the target domain;
    augment an input to the machine-learnt model with a set of masks corresponding to the set of support images to adapt the machine-learnt model from a source domain to the target domain;
    generate an output based on the input image and the target domain and the set of masks corresponding to the set of support images; and
    provide the output on a display to facilitate analysis comprising a visual comparison the performance of the system with and without domain adaptation.

12. A method for adapting a machine-learnt model trained using data corresponding to a source domain, the method comprising:
  receiving an input image, wherein the input image corresponds to a target domain;
  computing one or more features corresponding to the input image;
  identifying a set of support images based on the one or more features corresponding to the input image, wherein the set of support images corresponds to the target domain;
  augmenting an input to the machine-learnt model with a set of features, a set of masks, or both the set of features and the set of masks corresponding to the set of support images to adapt the machine-learnt model from its trained source domain to the target domain; wherein the features corresponding to the set of support images are computed by mimicking settings corresponding to a target domain during the training phase of the machine-learnt model with data corresponding to the source domain;
  generating an output based on the input image and the target domain and at least on the set of features, the set of masks, or both the set of features and the set of masks corresponding to the set of support images; and
  providing the output to facilitate analysis.

13. The method of claim 12, further comprising storing one or more features and one or more masks corresponding to the set of support images, the output, or combinations thereof, wherein the one or more features, the one or more masks, or both the one or more features and the one or more masks are tuned for performing classification, segmentation, or both classification and segmentation in a memory unit.

14. The method of claim 12, wherein identifying the set of support images comprises querying a memory unit to determine the set of support images based at least on the one or more features corresponding to the input image.

15. The method of claim 12, wherein augmenting the input to the machine-learnt model comprises:
  computing the one or more machine-learnt features, the one or more hard-coded features, or both the one or more machine-learnt features and the one or more hard-coded features corresponding to the set of support images; and providing as input to the machine-learnt model one or more machine-learnt features corresponding to the set of support images, one or more hard-coded features corresponding to the set of support images, one or more masks corresponding to the set of support images, or combinations thereof.

16. The method of claim 12, wherein generating the output comprises generating a mask, generating a binary value, or a combination thereof.

17. The method of claim 12, further comprising:
verifying validity of the output;
revising one or more annotations corresponding to the set of support images based on the validity of the output to generate a set of revised support images; and
updating the memory unit by storing the set of revised support images, features and masks, corresponding to the set of revised support images or combinations thereof.

18. The method of claim 17, further comprising updating the memory unit by deleting one or more of the set of support images based on relevance of the set of support images.

19. The method of claim 12, wherein the set of support images comprises a subset of images corresponding to the target domain.

20. The method of claim 12, further comprising adapting the machine-learnt model to the target domain without retraining the machine-learnt model.

21. The method of claim 12, wherein providing the output comprises presenting the output on an interface unit including a visual comparison the performance of the system with and without domain adaptation.

22. A method for adapting a machine-learnt model, the method comprising:
receiving an input image, wherein the input image corresponds to a target domain;
computing one or more features corresponding to the input image;
identifying a set of support images based on the one or more features corresponding to the input image, wherein the set of support images corresponds to the target domain, and wherein the machine-learnt model is trained on a source domain;
providing as input to the machine-learnt model the input image, a set of features, a set of masks, or both the set of features and the set of masks corresponding to the set of support images;
adapting the machine-learnt model to the target domain without retraining the machine-learnt model;
generating an output based on the input image, the set of features, the set of masks, or both the set of features and the set of masks corresponding to the set of support images; and
providing the output on a display to facilitate analysis, comprising a visual comparison the performance of the system with and without domain adaptation.

* * * * *